US012770918B2

(12) United States Patent
Yi et al.

(10) Patent No.: US 12,770,918 B2
(45) Date of Patent: Oct. 20, 2026

(54) NON-AQUEOUS FREESTANDING ION CONDUCTIVE GEL FOR ELECTROLYTE OF LITHIUM SECONDARY BATTERY AND PREPARATION METHOD THEREOF

(71) Applicants: POSTECH Research and Business Development Foundation, Pohang-si (KR); RESEARCH & BUSINESS FOUNDATION SUNGKYUNKWAN UNIVERSITY, Suwon-si (KR)

(72) Inventors: Gi-Ra Yi, Pohang-si (KR); Pil Jin Yoo, Seoul (KR); Tae Hui Kang, Yongin-si (KR); Seung-Jea Lee, Pohang-si (KR); Jeong Hoon Yoon, Suwon-si (KR); Jun Hyuk Lee, Suwon-si (KR); Won Jang Cho, Seoul (KR)

(73) Assignees: POSTECH RESEARCH AND BUSINESS DEVELOPMENT FOUNDATION, Pohang-si (KR); RESEARCH & BUSINESS FOUNDATION SUNGKYUNKWAN UNIVERSITY, Suwon-si (KR)

(*) Notice: Subject to any disclaimer, the term of this patent is extended or adjusted under 35 U.S.C. 154(b) by 796 days.

(21) Appl. No.: 17/842,930

(22) Filed: Jun. 17, 2022

(65) Prior Publication Data

US 2023/0102003 A1 Mar. 30, 2023

(30) Foreign Application Priority Data

Jul. 27, 2021 (KR) ........................ 10-2021-0098381

(51) Int. Cl.
*H01M 10/0565* (2010.01)
*C08F 2/50* (2006.01)
(Continued)

(52) U.S. Cl.
CPC ........... *H01M 10/0565* (2013.01); *C08F 2/50* (2013.01); *H01M 10/052* (2013.01); *C08F 2/44* (2013.01);
(Continued)

(58) Field of Classification Search
CPC ............. H01M 10/056; H01M 10/052; H01M 10/0525; H01M 2300/0082;
(Continued)

(56) References Cited

U.S. PATENT DOCUMENTS

2009/0246625 A1* 10/2009 Lu ....................... H01M 4/1393 977/734
2009/0258275 A1* 10/2009 Kumagai ............... C08J 5/2231 429/493

FOREIGN PATENT DOCUMENTS

JP 5238680 7/2013
KR 10-2014-0046364 4/2014
(Continued)

OTHER PUBLICATIONS

Cais et al. (Synthesis and two-dimensional NMR of highly aregic poly(vinylidene fluoride, ACS Publications, 1985) was used as background. (Year: 1985).*
(Continued)

*Primary Examiner* — Jonathan Johnson
(74) *Attorney, Agent, or Firm* — LEX IP MEISTER, PLLC

(57) ABSTRACT

Proposed are a non-aqueous freestanding ion conductive gel for application to an electrolyte of a lithium secondary battery and a preparation method thereof. The non-aqueous freestanding ion conductive gel including: a matrix including a hydrophobic polymer formed through polymerization of monomers having an unsaturated double-bond; a domain dispersed in the matrix and including a hydrophilic ionic
(Continued)

liquid; and a surface active layer including an ionic liquid having surface activity, in which a portion of a hydrophobic segment in a chain of the ionic liquid having surface activity is positioned in the matrix, and a portion of a hydrophilic segment in the chain is positioned in the domain. The gel has high ionic conductivity, high lithium ion transference number, and excellent mechanical strength. The gel can be used as an electrolyte of a lithium.

11 Claims, 5 Drawing Sheets

(51) Int. Cl.
*H01M 10/052* (2010.01)
*C08F 2/44* (2006.01)
*H01M 10/0525* (2010.01)

(52) U.S. Cl.
CPC .................. *H01M 10/0525* (2013.01); *H01M 2300/0045* (2013.01); *H01M 2300/0082* (2013.01); *H01M 2300/0085* (2013.01); *Y02E 60/10* (2013.01)

(58) Field of Classification Search
CPC .. H01M 2300/0085; H01M 2300/0045; Y02E 60/10; C08F 2/44; C08F 2/50
See application file for complete search history.

(56) References Cited

FOREIGN PATENT DOCUMENTS

| | | |
|---|---|---|
| KR | 10-2015-0064763 | 6/2015 |
| KR | 10-2021-0023341 | 3/2021 |

OTHER PUBLICATIONS

Ford et al. (Year: 2020).*
Yu et al. (Year: 2011).*
Liu et al. (Year: 2020).*
Sen et al. Supplementary Information (Year: 2020).*
Sen et al. (Year: 2020).*
Isabel Vázquez et al., "Influence of hydrophlic/hydrophobic protic ionic liquids (PILs) on the poly(vinylidene fluoride) (PVDFionic liquid) membrane properties", Journal of Materials Science (2020), vol. 55, pp. 16697-16717, Sep. 11, 2020.
Hicham Ben youcef et al., "Cross-Linked Solid Polymer Electrolyte for All-Solid-State Rechargeable Lithium Batteries", Electrochimica Acta 220 (2016) 587-594, Oct. 19, 2016, http://dx.doi.org/10.1016/j.electacta.2016.10.122.
Wenjing Tang et al., "Simultaneously Enhancing the Thermal Stability, Mechanical Modulus, and Electrochemical Performance of Solid Polymer Electrolytes by Incorporating 2D Sheets", Adv. Energy Mater. 2018, 8, 1800866, DOI: 10.1002/aenm.201800866.
Kai Zhu et al., "A fast charging/discharging all-solid-state lithium ion battery based on PEO-MIL-53(Al)-LiTFSI thin film electrolyte", RSC Adv., 2014, 4, 42278, DOI: 10.1039/c4ra06208f.
Ailian Wang et al., "Polymeric ionic liquid enhanced all-solid-state electrolyte membrane for high-performance lithium-ion batteries", Electrochimica Acta 276 (2018) 184-193, Apr. 21, 2018, https://doi.org/10.1016/j.electacta.2018.04.136.
K. M. Abraham et al., "Polyphosphazene-Poly(Olefin Oxide) Mixed Polymer Electrolytes", J. Electrochem. Soc., 1989, 136, 3576-3582.
Donggun Kim et al., "Amine-Functionalized Boron Nitride Nanosheets: A New Functional Additive for Robust, Flexible Ion Gel Electrolyte with High Lithium-Ion Transference Number", Adv. Funct. Mater. 2020, 30, 1910813, DOI: 10.1002/adfm.201910813.
KIPO, Office Action of Application No. 10-2021-0098381, dated Sep. 20, 2023, total 19 pages.

* cited by examiner

NON-AQUEOUS FREESTANDING ION CONDUCTIVE GEL FOR ELECTROLYTE OF LITHIUM SECONDARY BATTERY AND PREPARATION METHOD THEREOF

CROSS REFERENCE TO RELATED APPLICATION

The present application claims priority to Korean Patent Application No. 10-2021-0098381, filed Jul. 27, 2021, the entire contents of which is incorporated herein for all purposes by this reference.

BACKGROUND OF THE INVENTION

1. Field of the Invention

The present invention relates to a non-aqueous freestanding ion conductive gel for an electrolyte of a lithium secondary battery and a method of manufacturing the same. More particularly, the present invention relates to a non-aqueous freestanding bi-continuous ion conductive gel obtained by photopolymerizing an ionic liquid and a non-aqueous microemulsion from which water is removed with the use of an ionic liquid with a surface activity, and a method of preparing the same.

2. Description of the Related Art

Solid electrolytes can solve the stability-related problems of liquid electrolytes and suppress interfacial phenomena such as solid electrolyte interphase (SEI) and lithium dendrites that cause performance degradation at an interfacial area in an electrode. Among these solid electrolytes, a solid electrolyte obtained by adding additives and an ion accelerator to a general-purpose and high-conductivity polymer such as PEO, PAN, epoxy, or acrylate is applied to secondary batteries.

Gel-type solid polymer electrolytes are stable, but are problematic in that ionic conductivity and lithium ion transference number ($t_+$) are low, and mechanical strength is weak.

Therefore, it is necessary to develop a technology for a solid electrolyte having high ionic conductivity, high lithium ion transference number, and excellent mechanical strength and for a method for preparing the same.

SUMMARY OF THE DISCLOSURE

One objective of the present invention is to provide a solid electrolyte that can be used in an energy storage device due to high ionic conductivity, high lithium ion transference number, and excellent mechanical strength thereof and to provide a method of preparing the same solid electrolyte.

Another objective of the present invention is to provide a microemulsion that is actually applicable to a lithium secondary battery because water is not used and to provide a non-aqueous freestanding ion conductive gel using the same.

In one aspect of the present invention, there is provided a non-aqueous freestanding ion conductive gel including: a matrix including a hydrophobic polymer formed through polymerization of monomers having an unsaturated double-bond; a domain dispersed in the matrix and including a hydrophilic ionic liquid; and a surface active layer including an ionic liquid having surface activity, in which a portion of a hydrophobic segment in a chain of the ionic liquid having surface activity is positioned in the matrix, and a portion of a hydrophilic segment in the chain is positioned in the domain.

In addition, the non-aqueous freestanding ion conductive gel may have a bi-continuous structure in which the matrix is a continuous phase and the domain is also a continuous phase.

In addition, the domain may form an ion channel.

In addition, the thickness of the ion channel may be controlled by adjusting the content of the ionic liquid having the surface activity.

In addition, the domain may further include a lithium salt.

In addition, the lithium salt may include at least one selected from the group consisting of lithium bistrifluoromethanesulfonylimide ($LiN(CF_3SO_2)_2$, LiTFSI), lithium perchlorate ($LiClO_4$), lithium hexafluorophosphate ($LiPF_6$), lithium tetrafluoroborate ($LiBF_4$), lithium bisfluorosulfonylimide ($Li(FSO_2)_2N$), LiFSI), lithium triflate ($LiCF_3SO_3$) lithium difluoro(bis(oxalato))phosphate ($LiPF_2(C_2O_4)_2$), lithium tetrafluoro(oxalato)phosphate ($LiPF_4(C_2O_4)$), lithium difluoro(oxalato)borate ($LiBF_2(C_2O_4)$), and lithium bis(oxalato)borate ($LiB(C_2O_4)_2$).

In addition, the monomer including an unsaturated double bond may be one represented by Structural Formula 1 below.

[Structural Formula 1]

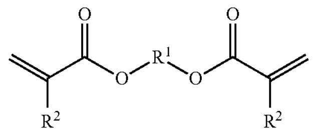

In Structural Formula 1, $R^1$ is a C3-C20 linear or branched alkylene group or a C6-$C_{30}$ arylene group, and $R^2$ is each independently a hydrogen atom or a C1-C3 linear or branched alkyl group.

In addition, the ionic liquid having surface activity may include an alkyl group having 8 or more carbon atoms in a chain thereof.

In addition, the ionic liquid having surface activity may include at least one selected from the group consisting of an imidazolium-based ionic liquid, pyridinium-based ionic liquid, a piperidinium-based ionic liquid, a pyrrolidinium-based ionic liquid, an ammonium-based ionic liquid, a phosphonium-based ionic liquid, and a sulfonium-based ionic liquid.

In addition, the hydrophilic ionic liquid may include an alkyl group having 5 or less carbon atoms in a chain thereof.

In addition, the hydrophilic ionic liquid may include at least one selected from the group consisting of an imidazolium-based ionic liquid, a pyridinium-based ionic liquid, a piperidinium-based ionic liquid, a pyrrolidinium-based ionic liquid, an ammonium-based ionic liquid, a phosphonium-based ionic liquid, and a sulfonium-based ionic liquid.

In addition, the non-aqueous freestanding ion conductive gel may have a thickness of 20 to 200 μm.

In another aspect of the present invention, there is provided an energy storage device including the non-aqueous freestanding ion conductive gel.

In addition, the energy storage device may be any one selected from the group consisting of a transistor, a super capacitor, and a lithium secondary battery.

In addition, the energy storage device may be a lithium secondary battery, and the non-aqueous freestanding ion gel may be used as any one selected from the group consisting of a separator and an electrolyte of a lithium secondary battery.

In a further aspect of the present invention, there is provided a method of preparing a non-aqueous freestanding ion conductive gel, the method including: (a) preparing a microemulsion including a hydrophilic ionic liquid, a monomer having an unsaturated double bond, and a photoinitiator; and (b) photopolymerizing the microemulsion to produce a non-aqueous freestanding ionic liquid gel.

The microemulsion may include 100 parts by weight of the hydrophilic ionic liquid; 10 to 80 parts by weight of the monomer having an unsaturated double bond; and 10 to 50 parts by weight of the ionic liquid having surface activity.

In addition, the microemulsion may contain 0.1 to 1 part by weight of the photoinitiator per 100 parts by weight of the monomer having an unsaturated double bond.

In addition, the non-aqueous freestanding ion conductive gel preparation method may further include, before (a), (a') preparing a mixture by mixing the hydrophilic ionic liquid with a lithium salt, in which (a) may be a step of preparing the microemulsion containing the mixture, the monomer having an unsaturated double bond, the ionic liquid having surface activity, and the photoinitiator.

In addition, the lithium salt may have a molar concentration of 0.1 to 10 M with respect to the sum of the hydrophilic ionic liquid and the lithium salt.

In addition, before (b), the non-aqueous freestanding ion conductive gel preparation method may further include (b') injecting the microemulsion into a glass mold.

The non-aqueous freestanding ion conductive gel of the present invention has high ionic conductivity, high lithium ion transference number, and high mechanical strength because an ion conductive region (domain) and a support region (matrix) having mechanical strength are continuously present in an interconnected state.

In addition, the non-aqueous freestanding ion conductive gel of the present invention is actually applicable to a lithium secondary battery because it is prepared from a microemulsion that does not contain water.

In addition, the non-aqueous freestanding ion conductive gel of the present invention can be used for various energy storage devices.

BRIEF DESCRIPTION OF THE DRAWINGS

Since the accompanying drawings are for reference in describing exemplary embodiments of the present invention, the technical spirit of the present invention should not be construed as being limited to the accompanying drawings.

DESCRIPTION OF THE PREFERRED EMBODIMENTS

Herein after, examples of the present invention will be described in detail with reference to the accompanying drawings in such a manner that the ordinarily skilled in the art can easily implement the present invention.

The description given below is not intended to limit the present invention to specific embodiments. In relation to describing the present invention, when the detailed description of the relevant known technology is determined to unnecessarily obscure the gist of the present invention, the detailed description may be omitted.

The terminology used herein is for the purpose of describing particular embodiments only and is not intended to limit the scope of the present invention. As used herein, the singular forms "a", "an", and "the" are intended to include the plural forms as well unless the context clearly indicates otherwise. It will be further understood that the terms "comprise" or "have" when used in this specification specify the presence of stated features, integers, steps, operations, elements and/or combinations thereof, but do not preclude the presence or addition of one or more other features, integers, steps, operations, elements, and/or combinations thereof.

Terms including ordinal numbers used in the specification, "first", "second", etc. can be used to discriminate one component from another component, but the order or priority of the components is not limited by the terms unless specifically stated. These teams are used only for the purpose of distinguishing a component from another component. For example, without departing from the scope of the present invention, a first component may be referred as a second component, and a second component may be also referred to as a first component.

In addition, when it is mentioned that a component is "famed" or "stacked" on another component, it should be understood such that one component may be directly attached to or directly stacked on the front surface or one surface of the other component, or an additional component may be disposed between them.

Hereinafter, a non-aqueous freestanding ion conductive gel for application to an electrolyte of a lithium secondary battery and a manufacturing method thereof according to the present invention will be described in detail. However, those are described as examples, and the present invention is not limited thereto and is only defined by the scope of the appended claims.

Figure 1:
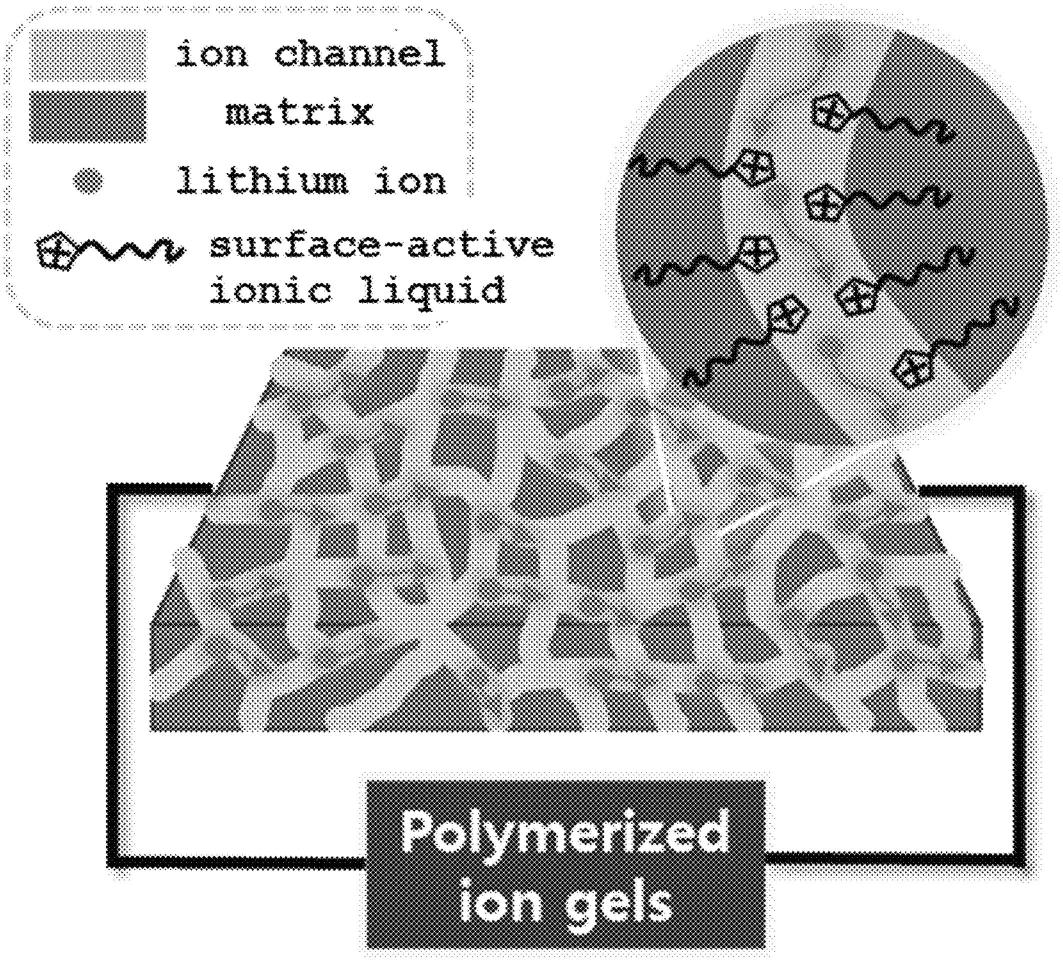
FIG. 1 is a schematic diagram of an internal structure of a non-aqueous freestanding ion conductive gel according to one embodiment of the present invention.

FIG. 1 is a schematic diagram of an internal structure of a non-aqueous freestanding ion conductive gel according to one embodiment of the present invention.

Referring to FIG. 1, the present provides a non-aqueous freestanding ion conductive gel including: a matrix including a hydrophobic polymer famed through polymerization of monomers having an unsaturated double-bond; a domain dispersed in the matrix and including a hydrophilic ionic liquid; and a surface active layer including an ionic liquid having surface activity, in which a portion of a hydrophobic segment in a chain of the ionic liquid having surface activity is positioned in the matrix, and a portion of a hydrophilic segment in the chain is positioned in the domain.

In addition, the non-aqueous freestanding ion conductive gel may have a bi-continuous structure in which the matrix is a continuous phase and the domain is also a continuous phase.

In addition, the domain may form an ion channel, and the thickness of the ion channel may be controlled depending on the content of the ionic liquid having surface activity.

In addition, the domain may further include a lithium salt.

In addition, the lithium salt may include at least one selected from the group consisting of lithium bistrifluoromethanesulfonylimide ($LiN(CF_3SO_2)_2$, LiTFSI), lithium perchlorate ($LiClO_4$), lithium hexafluorophosphate ($LiPF_6$), lithium tetrafluoroborate ($LiBF_4$), lithium bisfluorosulfonylimide ($Li(FSO_2)_2N$), LiFSI), lithium triflate ($LiCF_3SO_3$) lithium difluoro(bis(oxalato))phosphate ($LiPF_2$ $(C_2O_4)_2)_r$, lithium tetrafluoro(oxalato)phosphate ($LiPF_4$ $(C_2O_4)$), lithium difluoro(oxalato)borate ($LiBF_2$ $(C_2O_4)$), and lithium bis(oxalato)borate ($LiB(C_2O_4)_2$). Preferably, the lithium salt includes lithium bistrifluoromethanesulfonylimide ($LiN(CF_3SO_2)_2$, LiTFSI).

In addition, the monomer including an unsaturated double bond may be one represented by Structural Formula 1 below.

[Structural Formula 1]

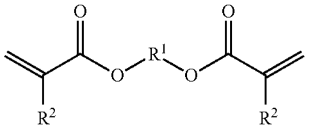

In Structural Formula 1, $R^1$ is a C3-C20 linear or branched alkylene group or a C6-C30 arylene group, and $R^2$ is each independently a hydrogen atom or a C1-C3 linear or branched alkyl group.

Preferably, in Structural Formula 1, $R^1$ is a C6-C18 alkylene group or a $C_6$-$C_{20}$ arylene group.

More preferably, the monomer including an unsaturated double bond may include 1,12-dodecanediol dimethacrylate.

In addition, the ionic liquid having surface activity may include an alkyl group having 8 or more carbon atoms in a chain thereof.

In addition, the ionic liquid having surface activity may include at least one selected from the group consisting of an imidazolium-based ionic liquid, a pyridinium-based ionic liquid, a piperidinium-based ionic liquid, a pyrrolidinium-based ionic liquid, an ammonium-based ionic liquid, a phosphonium-based ionic liquid, and a sulfonium-based ionic liquid.

The imidazolium-based ionic liquid includes, as cations, at least one selected from the group consisting of 1-methyl-3-octylimidazolium, 1-octyl-2,3-dimethylimidazolium, 1-decyl-3-methylimidazolium, 1-dodecyl-3-methylimidazolium, 1-tetradecyl-3-methylimidazolium, and 1-hexadecyl-3-methylimidazolium, and includes, as anions, at least one selected from the group consisting of chloride, bromide, iodide, hexafluorophosphate, tetrafluoroborate, hexafluoroantimonate, trifluoromethanesulfonate, methylsulfate, ethylsulfate, acetate, thiocyanate, dicyanamide and bis(triflurom-ethylsulfonyl)imide.

The pyridinium-based ionic liquid includes, as cations, at least one selected from the group consisting of 1-methyl octylpyridinium, 1-octyl-2,3-dimethylpyridinium, 1-decyl methylpyridinium, 1-dodecyl-3-methylpyridinium, 1-tetradecyl methylpyridinium, and 1-hexadecyl-3-methylpyridinium, and includes, as anions, at least one selected from the group consisting of chloride, bromide, iodide, hexafluorophosphate, tetrafluoroborate, hexafluoroantimonate, trifluoromethanesulfonate, methylsulfate, ethylsulfate, acetate, thiocyanate, dicyanamide, and bis(trifluromethylsulfonyl) imide.

The piperidinium-based ionic liquid includes, as cations, at least one selected from the group consisting of 1-methyl-3-octylpiperidinium, 1-octyl-2,3-dimethylpiperidinium, 1-decyl-3-methylpiperidinium, 1-dodecyl-3-methylpiperidinium, 1-tetradecyl-3-methylpiperidinium, and 1-hexadecyl-3-methylpiperidinium, and includes, as anions, at least one selected from the group consisting of chloride, bromide, iodide, hexafluorophosphate, tetrafluoroborate, hexafluoroantimonate, trifluoromethanesulfonate, methylsulfate, ethylsulfate, acetate, thiocyanate, dicyanamide, and bis(trifluromethylsulfonyl)imide.

The pyrrolidinium-based ionic liquid includes, as cations, at least one selected from the group consisting of 1-methyl-3-octylpyrrolidinium, 1-octyl-2,3-dimethylpyrrolidinium, 1-decyl-3-methylpyrrolidinium, 1-dodecyl-3-methylpyrrolidinium, 1-tetradecyl-3-methylpyrrolidinium, and 1-hexadecyl methylpyrrolidinium, and includes, as anions, at least one selected from the group consisting of chloride, bromide, iodide, hexafluorophosphate, tetrafluoroborate, hexafluoroantimonate, trifluoromethanesulfonate, methylsulfate, ethylsulfate, acetate, thiocyanate, dicyanamide, and bis(trifluromethylsulfonyl)imide.

The ammonium-based ionic liquid includes, as cations, at least one selected from the group consisting of 1-methyl-3-octylammonium, 1-octyl-2,3-dimethylammonium, 1-decyl-3-methylammonium, 1-dodecyl-3-methylammonium, 1-tetradecyl-3-methylammonium, and 1-hexadecyl-3-methylammonium, and includes, as anions, at least one selected from the group consisting of chloride, bromide, iodide, hexafluorophosphate, tetrafluoroborate, hexafluoroantimonate, trifluoromethanesulfonate, methylsulfate, ethylsulfate, acetate, thiocyanate, dicyanamide, and bis(trifluromethylsulfonyl)imide.

The phosphonium-based ionic liquid includes, as cations, at least one selected from the group consisting of 1-methyl-3-octylphosphonium, 1-octyl-2,3-dimethylphosphonium, 1-decyl-3-methylphosphonium, 1-dodecyl-3-methylphosphonium, 1-tetradecyl-3-methylphosphonium, and 1-hexadecyl-3-methylphosphonium, and includes, as anions, at least one selected from the group consisting of chloride, bromide, iodide, hexafluorophosphate, tetrafluoroborate, hexafluoroantimonate, trifluoromethanesulfonate, methylsulfate, ethylsulfate, acetate, thiocyanate, dicyanamide, and bis(trifluromethylsulfonyl)imide.

The sulfonium-based ionic liquid includes, as cations, at least one selected from the group consisting of 1-methyl octylsulfonium, 1-octyl-2,3-dimethylsulfonium, 1-decyl methylsulfonium, 1-dodecyl-3-methylsulfonium, 1-tetradecyl-3-methylsulfonium, and 1-hexadecyl-3-methylsulfonium, and includes, as anions, at least one selected from the group consisting of chloride, bromide, iodide, hexafluorophosphate, tetrafluoroborate, hexafluoroantimonate, trifluoromethanesulfonate, methylsulfate, ethylsulfate, acetate, thiocyanate, dicyanamide, and bis(trifluromethylsulfonyl)imide.

In addition, the hydrophilic ionic liquid may include an alkyl group having 5 or less carbon atoms.

In addition, the hydrophilic ionic liquid may include at least one selected from the group consisting of an imidazolium-based ionic liquid, a pyridinium-based ionic liquid, a piperidinium-based ionic liquid, a pyrrolidinium-based ionic liquid, an ammonium-based ionic liquid, a phosphonium-based ionic liquid, and a sulfonium-based ionic liquid.

The imidazolium-based ionic liquid includes, as cations, at least one selected from the group consisting of 1-methyl ethylimidazolium, 1-ethyl-2,3-dimethylimidazolium, 1-butyl methylimidazolium, 1-pentyl-3-methylimidazolium, and 1-pentyl-3-ethylimidazolium, and includes, as anions, at least one selected from the group consisting of chloride, bromide, iodide, hexafluorophosphate, tetrafluoroborate, hexafluoroantimonate, trifluoromethanesulfonate, methylsulfate, ethylsulfate, acetate, thiocyanate, dicyanamide, and bis(trifluromethylsulfonyl)imide.

The pyridinium-based ionic liquid includes, as cations, at least one selected from the group consisting of 1-methyl-3-ethylpyridinium, 1-ethyl-2,3-dimethylpyridinium, 1-butyl-3-methylpyridinium, 1-pentyl-3-methylpyridinium, and 1-pentyl-3-ethylpyridinium, and includes, as anions, at least one selected from the group consisting of chloride, bromide, iodide, hexafluorophosphate, tetrafluoroborate, hexafluoroantimonate, trifluoromethanesulfonate, methylsulfate, ethylsulfate, acetate, thiocyanate, dicyanamide, and bis(trifluromethylsulfonyl)imide.

The piperidinium-based ionic liquid includes, as cations, at least one selected from the group consisting of 1-methyl-3-ethylpiperidinium, 1-ethyl-2,3-dimethylpiperidinium, 1-butyl-3-methylpiperidinium, 1-pentyl-3-methylpiperidinium, and 1-pentyl-3-ethylpiperidinium, and includes, as anions, at least one selected from the group consisting of chloride, bromide, iodide, hexafluorophosphate, tetrafluoroborate, hexafluoroantimonate, trifluoromethanesulfonate, methylsulfate, ethylsulfate, acetate, thiocyanate, dicyanamide, and bis(trifluromethylsulfonyl)imide.

The pyrrolidinium-based ionic liquid includes, as cations, at least one selected from the group consisting of 1-methyl ethylpyrrolidinium, 1-ethyl-2,3-dimethylpyrrolidinium, 1-butyl-3-methylpyrrolidinium, 1-pentyl-3-methylpyrrolidinium, and 1-pentyl-3-ethylpyrrolidinium, and includes, as anions, at least one selected from the group consisting of chloride, bromide, iodide, hexafluorophosphate, tetrafluoroborate, hexafluoroantimonate, trifluoromethanesulfonate, methylsulfate, ethylsulfate, acetate, thiocyanate, dicyanamide, and bis(trifluromethylsulfonyl)imide.

The ammonium-based ionic liquid includes, as cations, at least one selected from the group consisting of 1-methyl-3-ethylammonium, 1-ethyl-2,3-dimethylammonium, 1-butyl-3-methylammonium, 1-pentyl-3-methylammonium, and 1-pentyl-3-ethylammonium, and includes, as anions, at least one selected from the group consisting of chloride, bromide, iodide, hexafluorophosphate, tetrafluoroborate, hexafluoroantimonate, trifluoromethanesulfonate, methylsulfate, ethylsulfate, acetate, thiocyanate, dicyanamide, and bis(trifluromethylsulfonyl)imide.

The phosphonium-based ionic liquid includes, as cations, at least one selected from the group consisting of 1-methyl ethylphosphnium, 1-ethyl-2,3-dimethylphosphnium, 1-butyl methylphosphnium, 1-pentyl-3-methylphosphnium, and 1-pentyl ethylphosphnium, and includes, as anions, at least one selected from the group consisting of chloride, bromide, iodide, hexafluorophosphate, tetrafluoroborate, hexafluoroantimonate, trifluoromethanesulfonate, methylsulfate, ethylsulfate, acetate, thiocyanate, dicyanamide, and bis(trifluromethylsulfonyl)imide.

The sulfonium-based ionic liquid includes, as cations, at least one selected from the group consisting of 1-methyl-3-ethylsulfonium, 1-ethyl-2,3-dimethylsulfonium, 1-butyl-3-methylsulfonium, 1-pentyl-3-methylsulfonium, and 1-pentyl-3-ethylsulfonium, and includes, as anions, at least one selected from the group consisting of chloride, bromide, iodide, hexafluorophosphate, tetrafluoroborate, hexafluoroantimonate, trifluoromethanesulfonate, methylsulfate, ethylsulfate, acetate, thiocyanate, dicyanamide, and bis(trifluromethylsulfonyl)imide.

In addition, the non-aqueous freestanding ion conductive gel may have a thickness of 20 to 200 μm and preferably a thickness of 130 to 160 μm. When the thickness is smaller than 20 μm, it is not preferable because it is too thin to have sufficient mechanical strength. When the thickness exceeds 200 μm, it is not preferable because the ion conductivity decreases as the moving distance increases.

The present invention provides an energy storage device including the non-aqueous freestanding ion conductive gel.

In addition, the energy storage device may be any one selected from the group consisting of a transistor, a super capacitor, and a lithium secondary battery.

In addition, the energy storage device may be a lithium secondary battery, and the non-aqueous freestanding ion gel may be used as any one selected from the group consisting of a separator and an electrolyte of a lithium secondary battery.

The present invention provides a method of preparing a non-aqueous freestanding ion conductive gel, the method including: (a) preparing a microemulsion including a hydrophilic ionic liquid, monomer having an unsaturated double bond, and a photoinitiator; and (b) photopolymerizing the microemulsion to produce a non-aqueous freestanding ionic liquid gel.

The microemulsion may include 100 parts by weight of the hydrophilic ionic liquid; 10 to 80 parts by weight of the monomer having an unsaturated double bond; and 10 to 50 parts by weight of the ionic liquid having surface activity.

Specifically, the microemulsion may include 10 to 80 parts by weight of the monomer having an unsaturated double bond and preferably 30 parts by weight of the monomer having an unsaturated double bond per 100 parts by weight of the hydrophilic ionic liquid. When the amount of the monomer having an unsaturated double bond is smaller than 30 parts by weight, the mechanical strength of the non-aqueous freestanding ion conductive gel is weak, so that when applied to a lithium secondary battery, lithium dendrites causes a short circuit, which is not preferable. When the amount exceeds 80 parts by weight, the ionic conductivity of the non-aqueous freestanding ion conductive gel is insufficient, which is not preferable.

Specifically, the microemulsion may include 10 to 50 parts by weight of the ionic liquid having surface activity and preferably 10 to 30 parts by weight of the ionic liquid having surface activity, per 100 parts by weight of the hydrophilic ionic liquid. When the amount of the ionic liquid having surface activity is less than 10 parts by weight, the microemulsion is not formed and the two immiscible liquids are present separately, which is not preferable because ion channels are not famed. When the amount exceeds 50 parts by weight, it is undesirable because the ionic liquid having surface activity cannot be completely dissolved because the amount is excessive.

In addition, the microemulsion may contain 0.1 to 1 part by weight of the photoinitiator per 100 parts by weight of the monomer having an unsaturated double bond. When the amount of the photoinitiator is less than 0.1 part by weight, it is not preferable because a non-aqueous freestanding ion conductive gel is not formed from the microemulsion. When the amount exceeds 1 part by weight, photopolymerization occurs excessively, thereby increasing crosslinking density and decreasing ionic conductivity, which are not preferable.

The non-aqueous freestanding ion conductive gel preparation method may further include, before (a), (a') preparing a mixture by mixing the hydrophilic ionic liquid with a lithium salt, in which (a) may be a step of preparing the microemulsion containing the mixture, the monomer having an unsaturated double bond, the ionic liquid having surface activity, and the photoinitiator In addition, the molar concentration of the lithium salt with respect to the sum of the hydrophilic ionic liquid and the lithium salt may be in the range of 0.1 to 10 M, preferably in the range of 0.5 to 5 M, and most preferably in the range of 0.7 to 1.5 M. When the concentration of the lithium salt is lower than 0.1 M, the ionic conductivity of the non-aqueous freestanding ion conductive gel is insufficient, which is undesirable. When the concentration exceeds 10 M, an increase in the effect of the lithium salt is insignificant compared to an increase in the amount of the lithium salt used. In addition, it is not desirable because an excessive amount of the lithium salt is not dissolved.

In addition, before (b), the non-aqueous freestanding ion conductive gel preparation method may further include (b') injecting the microemulsion into a glass mold.

EXAMPLE

Hereinafter, a preferred example of the present invention will be described. However, the example is for illustrative purposes, and the scope of the present invention is not limited thereto.

Preparation of Non-Aqueous Freestanding Ion Conductive Gel Example 1

A 1M-concentration lithium solution was obtained by dissolving lithium bis(trifluoromethanesulfonyl)imide (LiTFSi) as a lithium salt in 1-ethyl-3-methylimidazolium bis(trifluoromethanesulfonyl)imide (C2MIM TFSi) as a hydrophilic ionic liquid.

60% by weight of C2MIM TFSi containing 1 M of lithium salt, 30% by weight of 1,12-dodecanediol dimethacrylate (C12-DMA) having an unsaturated double bond, which is a monomer, 10% by weight of 1-methyl-3-tetradecylimidazolium, which is an ionic liquid having surface activity, and 1% by weight C12-DMA, which is a photoinitiator, were mixed, and the mixture was stirred at room temperature for one day to prepare a transparent microemulsion.

The microemulsion was injected into a glass mold and photopolymerized through a light exposure machine to prepare a non-aqueous freestanding ion conductive gel (thickness: 130 to 160 μm).

Example 2

A non-aqueous freestanding ion conductive gel was prepared in the same manner as in Example 1, except that 15% by weight of the ionic liquid having surface activity was used instead of 10% by weight of the ionic liquid having surface activity.

Example 3

A non-aqueous freestanding ion conductive gel was prepared in the same manner as in Example 1, except that 20% by weight of the ionic liquid having surface activity was used instead of 10% by weight of the ionic liquid having surface activity.

Example 4

A non-aqueous freestanding ion conductive gel was prepared in the same manner as in Example 1, except that 25% by weight of the ionic liquid having surface activity was used instead of 10% by weight of the ionic liquid having surface activity.

Example 5

A non-aqueous freestanding ion conductive gel was prepared in the same manner as in Example 1, except that 30% by weight of the ionic liquid having surface activity was used instead of 10% by weight of the ionic liquid having surface activity.

Manufacturing of Half-Cell Battery Device Example 1

A half-cell was manufactured by using the non-aqueous freestanding ion conductive gel prepared in Example 1 was used as an electrolyte, lithium iron phosphate (LFP) as a cathode material, and lithium. The LFP cathode electrode material was prepared by mixing a cathode active material ($LiFePO_4$), a conductive material, and a binder (PVDF) at a weight ratio of 8:1:1, adding a small amount of NMP solvent to obtain a slurry, applying the slurry to an aluminum current collector, drying the resulting structure, and compressing the structure through hot pressing.

EXPERIMENTAL EXAMPLE

Figure 2:
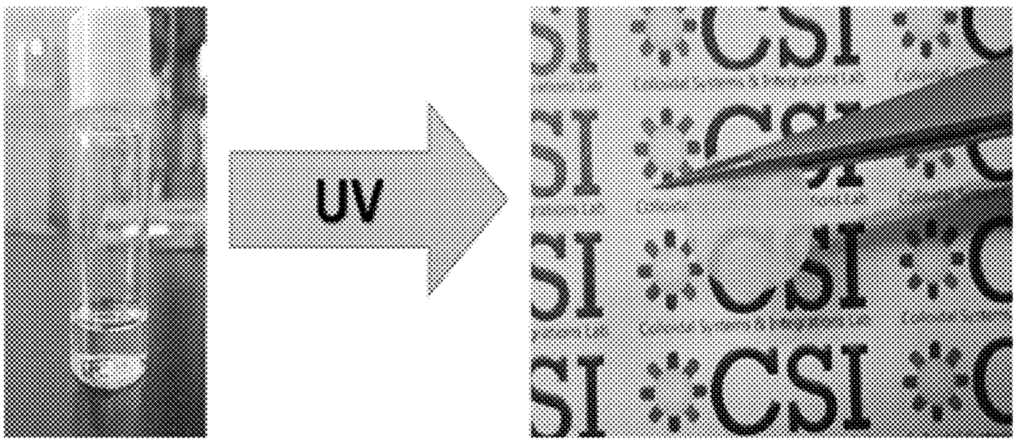
FIG. 2 is a photograph of a microemulsion (left) prepared according to Example 1 and a non-aqueous freestanding ion conductive gel (right) prepared by photopolymerizing the microemulsion.

Experimental Example 1 Confirmation of Preparation of Non-Aqueous Freestanding Ion Conductive Gel FIG. 2 is a photograph of a microemulsion (left) prepared according to Example 1 and a non-aqueous freestanding ion conductive gel (right) prepared by photopolymerizing the microemulsion.

Referring to FIG. 2, it was confirmed that a non-aqueous freestanding ion conductive gel was prepared by mixing hydrophilic C2MIM TFSi and hydrophobic C12-DMA, which are immiscible with each other, with $Cl_4$MIM TFSi, which is an ionic liquid having surface activity to prepare a microemulsion, and then photopolymerizing the microemulsion.

In addition, it was confirmed that the microemulsion prepared according to the present invention was maintained in a state in which the system was not broken even for several months.

Experimental Example 2 SAXS Analysis

Figure 3A:
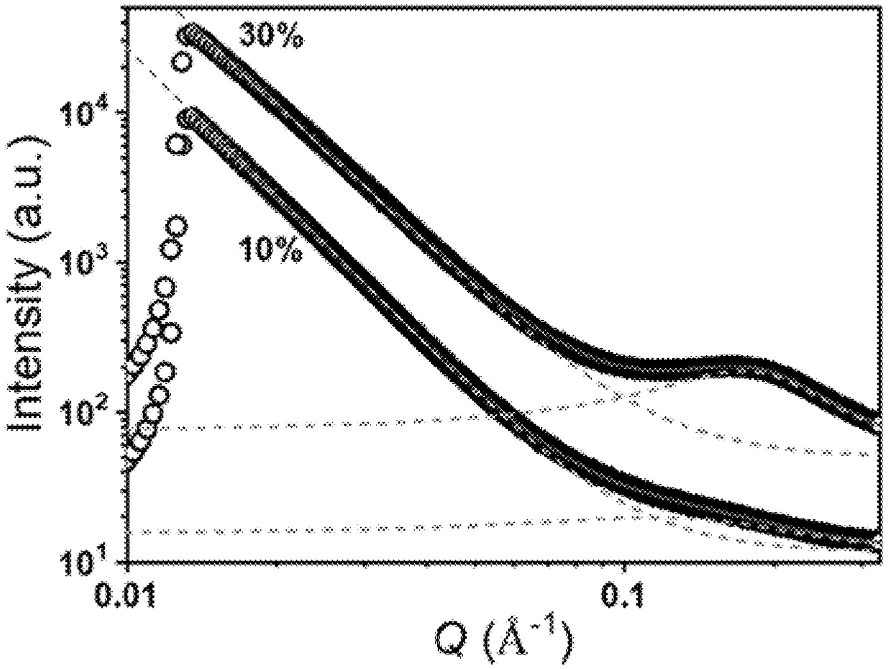
FIG. 3*a* shows the results of small-angle X-ray scattering (SAXS) analysis of non-aqueous freestanding ion conductive gels prepared according to Examples 1 and 5.
Figure 3B:
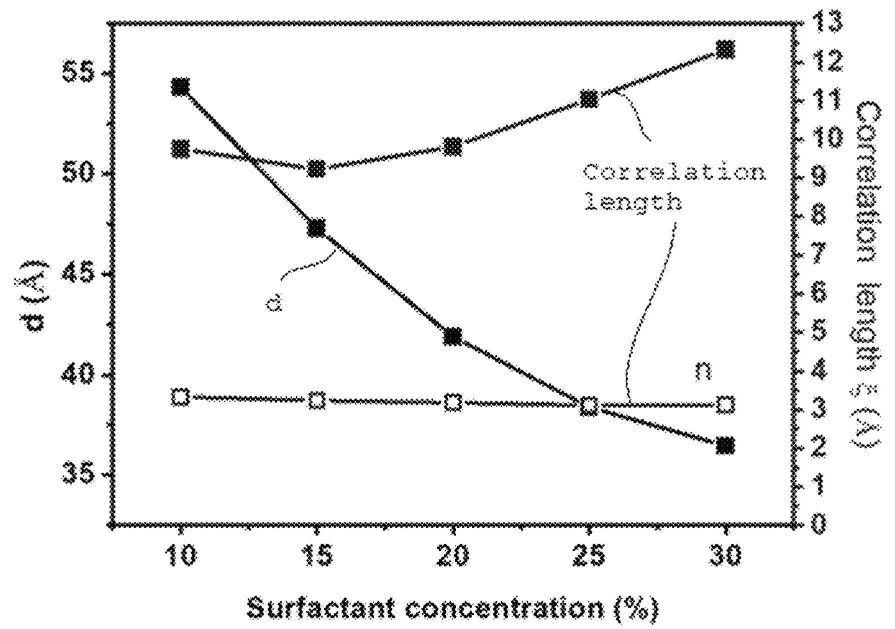
FIG. 3*b* is a view showing the size of the internal structure measured according to the SAXS analysis result of each of the non-aqueous freestanding ion conductive gels prepared according to Examples 1 to 5.

FIG. 3*a* shows the SAXS analysis result of each of the non-aqueous freestanding ion conductive gels prepared according to Examples 1 to 5, and FIG. 3*b* shows the size of the internal structure measured according to the SAXS analysis result of each of the non-aqueous freestanding ion conductive gels prepared according to Examples 1 to 5.

Through the small-angle X-ray scattering (SAXS) analysis using X-rays scattered at a small angle in the range of 0.001° to 5° shows the presence of a structure having a size of several to tens of nanometers. From the position, sharpness, and gradient of the peak (Q), it is possible to know structural information (form factor) and interaction (structure factor) between internal structures.

Referring to FIG. 3*a*, in the case of Example 5 using 30% by weight of an ionic liquid having surface activity, a peak near Q=0.17 $Å^{-1}$ is detected, indicating that the structure having a size of about 36.5 Å repeatedly occurs. An isotropic pattern was observed on the 2-D pattern, indicating that the structure is a bi-continuous structure that is not aligned in one direction like a lamellar structure.

In addition, a broad peak was detected at Q=0.16 $Å^{-1}$ (38.3 Å) by comparing the SAXS analysis of each sample in the state of a microemulsion solution (liquid, before curing). Through this, it is confirmed that a solid polymer electrolyte having a bi-continuous structure was formed from a self-assembled structure of a bi-continuous microemulsion composed of an ionic liquid having surface activity, which is a solution phase.

Referring to FIGS. 3*a* and 3*b*, it is confirmed that the position of the peak is decreased while maintaining the gradient ($=-_3$) when the amount of the ionic liquid having surface activity is changed from 30% by weight to 10% by weight, and it is confirmed that they match through fitting with the bi-continuous structure. From this result, it is determined that the bi-continuous structure occurs in both conditions, but the size of the ion channel differs between the conditions.

Experimental Example 3: Check Ionic Conductivity and Mechanical Properties

Figure 3C:
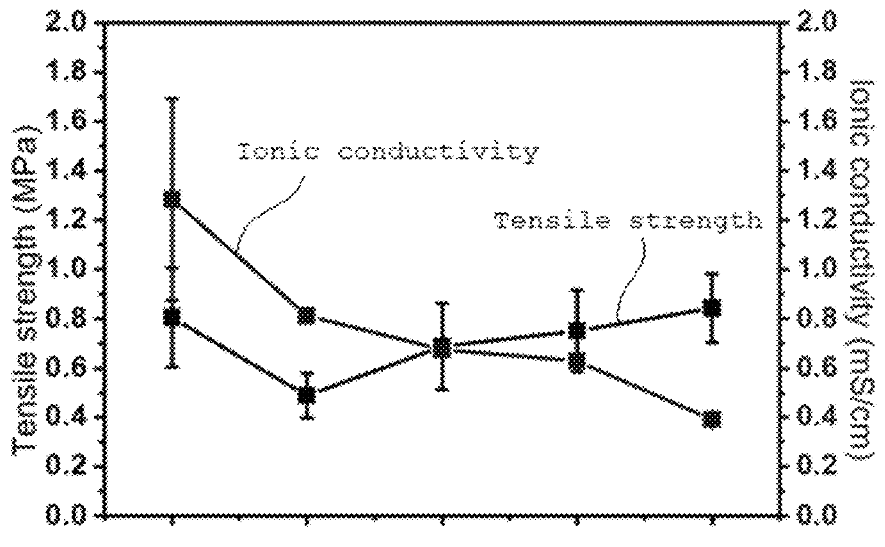
FIG. 3*c* is a graph showing the measured ionic conductivity and mechanical strength of each of the non-aqueous freestanding ion conductive gels prepared according to Examples 1 to 5.

FIG. 3*c* shows the measurements of the ionic conductivity and mechanical strength of each of the non-aqueous freestanding ion conductive gels prepared according to Examples 1 to 5. Table 1 below summarizes the ionic conductivity, transference number, and mechanical strength of the non-aqueous freestanding ion conductive gel prepared according to one example (present work) of the present invention and of solid polymer electrolytes (Ref. 1 to Ref. 6) disclosed in the paper.

In detail, impedance was measured using electrochemical impedance spectroscopy (EIS), ionic conductivity was measured using Equation 1 below, and mechanical strength was measured through a tensile strength test using a universal tensile machine (UTM).

$$\sigma = \frac{d}{RA} \quad \text{[Equation 1]}$$

In Equation 1,

σ is ionic conductivity, d is the thickness of an electrolyte,

R is the resistance value (impedance) of an electrolyte through EIS, and

A is the area of an electrolyte (diameter of 16 mm).

TABLE 1

| Classification | Material | Ionic conductivity [S/cm] at 25° C. | Transference number $t_+$ | Mechanical property (tensile strength) [MPa] | Paper |
|---|---|---|---|---|---|
| Ref. 1 | PEO PEDA DVP LiTFSi | $3.0 \times 10^{-6}$ | 0.21 | — | Electrochim. Acta. 220 (2016) , pp. 587-594 |
| Ref. 2 | PEO/LiTFSi/ 10% VS | $2.9 \times 10^{-5}$ | 0.246 | 0.8 | Adv. Energy Mater. 2018,8, 1800866 |
| Ref. 3 | PEO-MIL-53 (A1) - LiTFSi | $1.62 \times 10^{-5}$ (at 30° C.) | 0.343 | 0.8 | RSC Adv., 2014, 4, 42278 |
| Ref. 4 | PVIMTFSi-co-PPEGMA/LiTFSi | $1.3 \times 10^{-5}$ | — | 0.45 | Electrochim. Acta.276 (2018), pp. 184-193 |
| Ref. 5 | PEO/MEEP-LiBF 4 | $4.0 \times 10^{-6}$ | — | — | J. Electrochem. Soc., 1989, 136, 3576-3582 |
| Ref. 6 | BN-(PVDF-HFP)-TMPTA | $6.47 \times 10^{-4}$ | 0.23 | 2.22 | Adv. Funct. Mater. 2020, 30, 1910813 |

TABLE 1-continued

| Classification | Material | Ionic conductivity [S/cm] at 25° C. | Transference number $t_+$ | Mechanical property (tensile strength) [MPa] | Paper |
|---|---|---|---|---|---|
| This work | C2MIM TFSi/C12-DMA/C14MIM TFSi | $0.4 \times 10^{-3}$ to $1.4 \times 10^{-3}$ | 0.56 | 0.6 to 0.8 | — |

Referring to Table 1 and FIG. 3*c*, it is confirmed that the ionic conductivity ($0.4\times10^{-3}$ to $1.4\times10^{-3}$ S/cm, at room temperature) of the non-aqueous free prepared according to the example of the present invention is higher than the ionic conductivity ($1\times10^{-6}$ to $1\times10^{-4}$ S/cm, at room temperature) of the solid polymer electrolyte described in the paper.

In addition, the mechanical strength of the non-aqueous freestanding ion conductive gel prepared according to the example of the present invention is 0.6 to 0.8 MPa, which is similar to that of the solid polymer electrolyte. That is, the non-aqueous freestanding ion conductive gel according to the example of the present invention is higher in ionic conductivity than and is similar in mechanical strength to the solid polymer electrolyte.

Experimental Example 4: Checking of Current Flow Over Time

Figure 4:
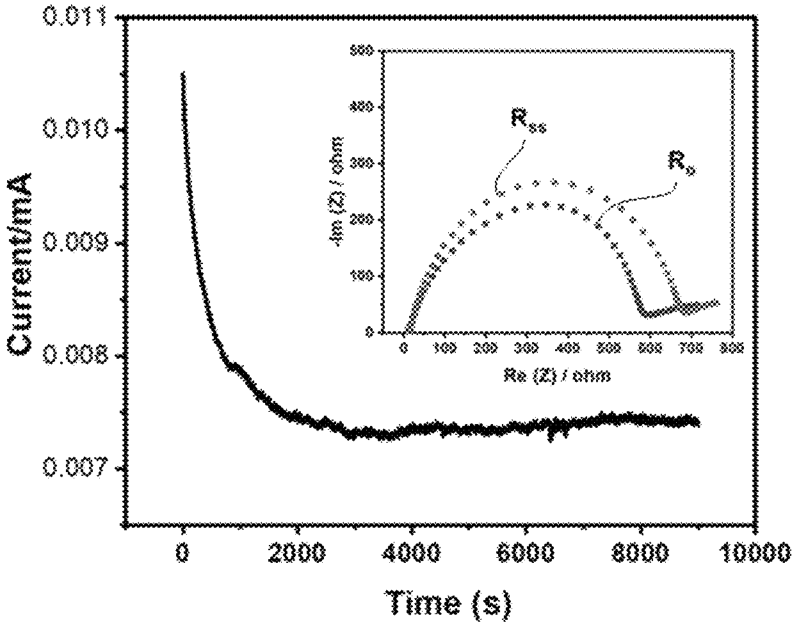
FIG. 4 is a time-and-current graph of the non-aqueous freestanding ion conductive gel prepared according to Example 1, in which the graph of FIG. 4 shows impedance values before and after polarization.

FIG. 4 is a time-and-current graph of the non-aqueous freestanding ion conductive gel prepared according to Example 1, in which the graph of FIG. 4 shows impedance values before and after polarization.

Lithium ion transference numbers $t_+$ can be found with reference to FIG. 4 and Equation 2 below.

$$t_+ = \frac{I_{ss}(\Delta V - I_O R_O)}{I_O(\Delta V - I_{SS} R_{SS})} \quad \text{[Equation 2]}$$

In Equation 2, $I_{ss}$ is a current value when the current is constant after polarization (steady state), $I_O$ is an initial current value (before polarization), $R_{ss}$ is a resistance value when the current is constant after polarization, $R_O$ is a resistance value (before polarization), and V is a voltage (10 mV) applied.

Referring to FIG. 4, it is possible to confirm the resistance and current values before and after polarization caused by the movement of ions contained in the ion gel to a lithium metal over time. The lithium ion transference number $t_+$ represents the transfer efficiency of only lithium cations in all ionic species, and the non-aqueous freestanding ion conductive gel prepared according to Example 1 has a value of 0.56.

Referring to Table 1 and FIG. 4, the transference number (0.56, at room temperature) of the non-aqueous freestanding ion conductive gel prepared according to the example of the present invention is higher than the transference number (0.21 to 0.343, at room temperature) of the solid polymer electrolyte described in the paper.

Experimental Example 5: Checking Data of Drive of Half-Cell

Figure 5A:
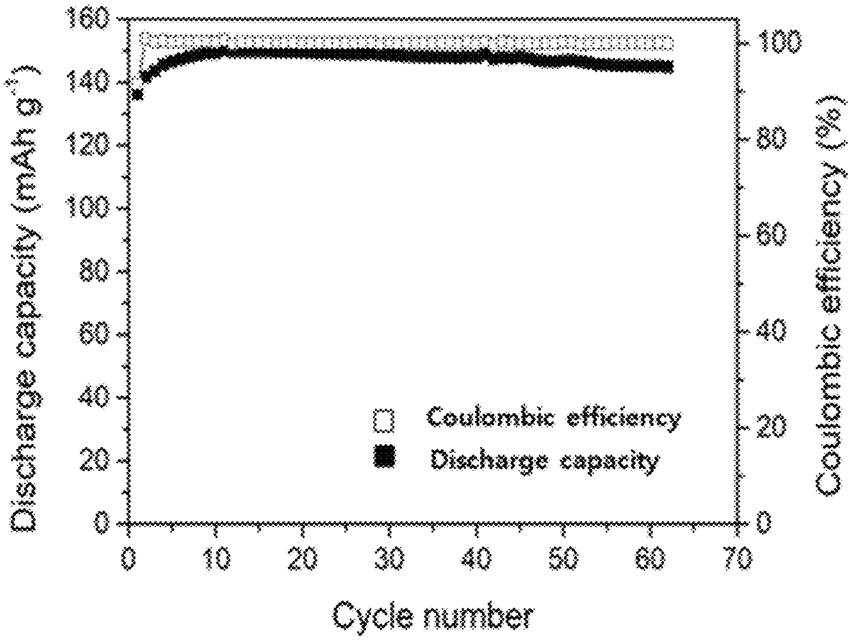
FIG. 5*a* shows capacity change (black square) and Coulombic efficiency (white square) according to the cycle of a half cell manufactured according to Device Example 1.
Figure 5B:
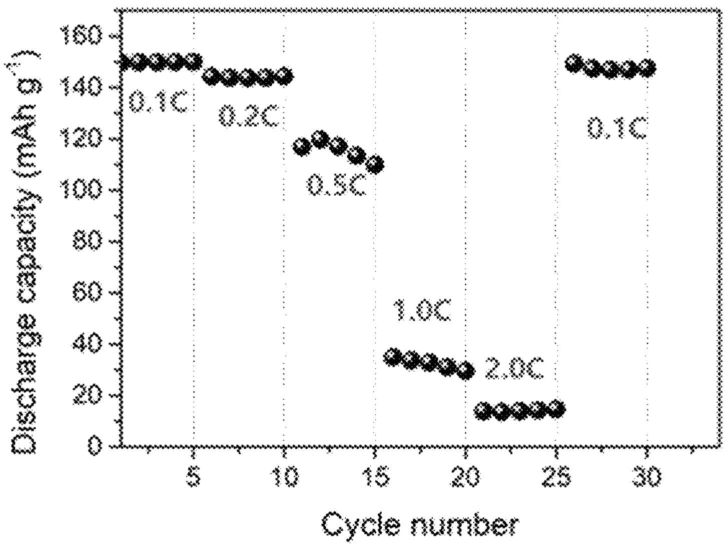
FIG. 5*b* shows capacity change according to the C-rate of the half-cell manufactured according to Device Example 1.

FIG. 5*a* shows capacity change and Coulombic efficiency according to the cycle of a half cell manufactured according to Device Example 1. In FIG. 5*a*, black squares indicate discharge capacity according to cycles, and white squares indicate coulombic efficiency according to cycles. FIG. 5*b* shows capacity change according to the C-rate of the half-cell manufactured according to Device Example 1.

Referring to FIG. 5*a*, it is confirmed that the capacity is stably maintained even at 0.2 C, and the Coulombic efficiency, which is the efficiency of lithium cations that substantially contribute to charging/discharging, is maintained at 99% or more.

Referring to FIG. 5*b*, it is confirmed that the capacity is decreased as the rate is changed to 0.1, 0.2, 0.5, 1.0, and 2.0, but the capacity is recovered when the rate is set to 0.1 C again.

Figure 5C:
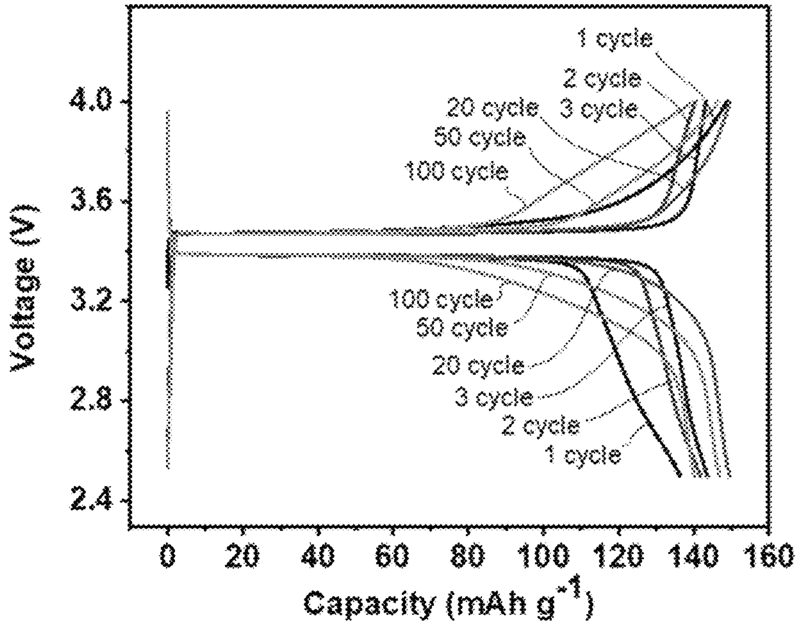
FIG. 5*c* is a graph showing capacitance values according to voltage of the half-cell manufactured according to Device Example 1 and showing a charge-discharge curve according to cycles.

FIG. 5*c* is a graph showing capacitance values according to voltage of the half-cell manufactured according to Device Example 1 and showing a charge-discharge curve according to cycles.

Referring to FIG. 5*c*, it is confirmed that the capacity increases after the first cycle. This indicates that the electrode-electrolyte interface was initially unstable but then stabilized.

The scope of the present invention is defined by the following claims rather than the above detailed description, and all changes or modifications derived from the meaning and scope of the claims and their equivalent concepts should be interpreted as falling into the scope of the present invention.

What is claimed is:

1. A non-aqueous freestanding ion conductive gel comprising:

a matrix comprising a hydrophobic polymer including repeating units derived from a monomer having an unsaturated double bond;

a domain dispersed in the matrix and comprising a hydrophilic ionic liquid; and a surface active layer comprising an ionic liquid having surface activity, wherein a portion of a hydrophobic segment in a chain of the ionic liquid having surface activity is positioned in the matrix, and a portion of a hydrophilic segment in the chain is positioned in the domain, wherein the non-aqueous freestanding ion conductive gel is a bi-continuous structure in which the matrix is a continuous phase and the domain is a continuous phase, wherein the monomer having an unsaturated double bond is represented by Structural Formula 1 below,

[Structural Formula 1]

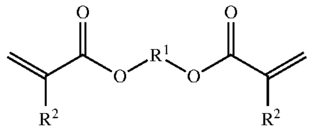

in Structural Formula 1, $R^1$ is a C3-C20 linear or branched alkylene group and $R^2$ is each independently a hydrogen atom or a C1-C3 linear or branched alkyl group, the hydrophobic polymer comprises a C3-C20 linear or branched alkylene group, and wherein the ionic liquid having surface activity comprises at least one selected from the group consisting of imidazolium-based ionic liquid, pyridinium-based ionic liquid, piperidinium-based ionic liquid, pyrrolidinium-based ionic liquid, phosphonium-based ionic liquid, and sulfonium-based ionic liquid.

2. The non-aqueous freestanding ion conductive gel of claim 1, wherein the domain forms an ion channel.

3. The non-aqueous freestanding ion conductive gel of claim 2, wherein a thickness of the ion channel varies depending on the content of the ionic liquid having surface activity.

4. The non-aqueous freestanding ion conductive gel of claim 1, wherein the domain further comprises a lithium salt.

5. The non-aqueous freestanding ion conductive gel of claim 4, wherein the lithium salt comprises at least one selected from the group consisting of lithium bistrifluoromethanesulfonylimide ($LiN(CF_3SO_2)_2$, LiTFSI), lithium perchlorate ($LiClO_4$), lithium hexafluorophosphate ($LiPF_6$), lithium tetrafluoroborate ($LiBF_4$), lithium bisfluorosulfonylimide ($Li(FSO_2)_2N$), LiFSI), lithium triflate ($LiCF_3SO_3$), lithium difluoro(bis(oxalato))phosphate ($LiPF_2(C_2O_4)_2$), lithium tetrafluoro(oxalato)phosphate ($LiPF_4(C_2O_4)$), lithium difluoro(oxalato)borate ($LiBF_2(C_2O_4)$), and lithium bis(oxalato)borate ($LiB(C_2O_4)_2$).

6. The non-aqueous freestanding ion conductive gel of claim 1, wherein the ionic liquid having surface activity comprises an alkyl group having 8 or more carbon atoms.

7. The non-aqueous freestanding ion conductive gel of claim 1, wherein the hydrophilic ionic liquid comprises an alkyl group having 5 or less carbon atoms.

8. The non-aqueous freestanding ion conductive gel of claim 7, wherein the hydrophilic ionic liquid comprises at least one selected from the group consisting of imidazolium-based ionic liquid, pyridinium-based ionic liquid, piperidinium-based ionic liquid, pyrrolidinium-based ionic liquid, ammonium-based ionic liquid, phosphonium-based ionic liquid, and sulfonium-based ionic liquid.

9. The non-aqueous freestanding ion conductive gel of claim 1, having a thickness of 20 to 200 μm.

10. An energy storage device comprising the non-aqueous freestanding ion conductive gel of claim 1.

11. The energy storage device of claim 10, wherein the energy storage device is any one selected from the group consisting of a transistor, a super capacitor, and a lithium secondary battery.

* * * * *